US011540536B2

(12) United States Patent
Lewis et al.

(10) Patent No.: US 11,540,536 B2
(45) Date of Patent: Jan. 3, 2023

(54) METHOD FOR PRESERVING PLANT MATERIAL

(75) Inventors: David Adrian Lewis, Rozelle (AU); Deborah Ann Lewis, Rozelle (AU)

(73) Assignee: BOTANICAL FOOD COMPANY PTY LTD., Palmwoods (AU)

( * ) Notice: Subject to any disclaimer, the term of this patent is extended or adjusted under 35 U.S.C. 154(b) by 232 days.

(21) Appl. No.: 13/880,512

(22) PCT Filed: Oct. 21, 2011

(86) PCT No.: PCT/AU2011/001347
§ 371 (c)(1),
(2), (4) Date: Jul. 9, 2013

(87) PCT Pub. No.: WO2012/051670
PCT Pub. Date: Apr. 26, 2012

(65) Prior Publication Data
US 2013/0287909 A1    Oct. 31, 2013

(30) Foreign Application Priority Data

Oct. 21, 2010    (AU) ................................ 2010904701

(51) Int. Cl.
A23L 3/01       (2006.01)
A23B 7/02       (2006.01)
A23B 7/154      (2006.01)
A23B 7/157      (2006.01)
A23B 7/01       (2006.01)

(52) U.S. Cl.
CPC  *A23L 3/01* (2013.01); *A23B 7/01* (2013.01); *A23B 7/02* (2013.01); *A23B 7/154* (2013.01); *A23B 7/157* (2013.01)

(58) Field of Classification Search
CPC .... A23L 3/01; A23B 7/01; A23B 7/02; A23B 7/157; A23B 7/154
See application file for complete search history.

(56) References Cited

U.S. PATENT DOCUMENTS

| | | |
|---|---|---|
| 4,572,836 A | 2/1986 | Bakal |
| 4,948,609 A | 8/1990 | Nafisi-Movaghar |
| 4,975,246 A | 12/1990 | Charm |
| 5,002,784 A | 3/1991 | Pare et al. |
| 5,093,145 A | 3/1992 | Darbonne et al. |
| 5,227,183 A | 7/1993 | Aung et al. |
| 5,858,446 A | 1/1999 | Lewis et al. |
| 5,912,034 A | 6/1999 | Martin et al. |
| 5,925,395 A | 7/1999 | Chen |
| 5,956,865 A | 9/1999 | Durance et al. |
| 5,962,057 A | 10/1999 | Durance et al. |
| 6,004,950 A | 12/1999 | Friesen et al. |
| 6,061,926 A | 5/2000 | Pare et al. |
| 6,270,773 B1 | 8/2001 | Pourrat et al. |
| 7,214,399 B2 | 5/2007 | Froehlich et al. |
| 2002/0031598 A1 | 3/2002 | Lukas et al. |
| 2006/0034981 A1 | 2/2006 | Pan et al. |
| 2011/0277337 A1* | 11/2011 | Ruden .................. A23L 33/105 34/259 |
| 2013/0287909 A1 | 10/2013 | Lewis et al. |

FOREIGN PATENT DOCUMENTS

| | | |
|---|---|---|
| AU | 20113128254 | 4/2013 |
| CN | 1943374 A | 8/2006 |
| CN | 11480208 A | 1/2008 |
| CN | 101223985 A | 7/2008 |
| CN | 101249143 A | 8/2008 |
| EP | 1 010 368 A1 | 6/2000 |
| EP | 1197151 A2 | 4/2002 |
| EP | 2629621 | 8/2013 |
| FR | 2553873 | 4/1985 |
| JP | 2007-312764 A | 12/2007 |
| WO | 94/00029 | 1/1994 |
| WO | 03/011058 A1 | 2/2003 |
| WO | 03/049546 A1 | 6/2003 |
| WO | 2012/051670 | 7/2018 |

OTHER PUBLICATIONS

Torringa et al., "Osmotic Dehydration as a Pre-Treatment Before Combined Microwave-Hot-Air Drying of Mushrooms". Journal of Food Engineering 49: 185-191 (2001).*
Rodriguea-Lopez et al., "Thermal Inactivation of Mushroom Polyphenoloxidase Emplying 2450 MHz Microwave Radiation". J. Agric Food Chem 47: 3028-3035 (1999).*
Puckett., "Food Service Manual". 3rd Edition., Jossey-Bass., p. 483 (2004).*
Tonatand et al., "Preliminary Study of Chili Drying Using Microwave Assisted Vaccum Drying Technology". Asian Journal of Food and Agro Industry., 2(02), pp. 80-86. (2009).*
Sunjka et al., "Microwave-Convective and Microwave-Vacuum Drying of Cranberries—Comparative Study". Drying Technology vol. 22, No. 5, pp. 1217-1231 (Year: 2004).*

(Continued)

*Primary Examiner* — Erik Kashnikow
*Assistant Examiner* — Assaf Zilbering
(74) *Attorney, Agent, or Firm* — Greenblum & Bernstein, P.L.C.

(57) ABSTRACT

Disclosed herein is a method for preserving a plant material. The method comprises applying a composition comprising a microwave attractant to the plant material; and then drying the plant material while exposing the plant material to microwave energy, wherein the microwave energy heats the plant material to a temperature effective to inactivate the majority of any browning enzymes in the plant material, and wherein the microwave attractant results in the heating of the plant material occurring at a rate whereby browning of the plant material by the browning enzymes during heating is substantially prevented. Also disclosed are uses of the preserved plant material.

16 Claims, No Drawings

(56) References Cited

OTHER PUBLICATIONS

Lewicki, "Effect of pre-drying treatment, drying and rehydration on plant tissue properties: A review". International Journal of Food Properties, 1:1, 1-22, (Year: 1998).*

Sheetal Gupta, et al; "Effect of different blanching treatments on ascorbic acid retention in green leafy vegetables", Natural Product Radiance, vol. 7(2), pp. 111-116, Mar.-Apr. 2008.

Vibhakara HS, et al; "Effect of gamma-irradiation in combination preservation technique for stabilizing high moisture spice based vegetables", J. Food Sci. Technol, vol. 42(5), pp. 434-438; Jan. 2005.

Marcos Vieira Da Silva, et al; "Concepts and Methods of Control of Enzymatic Browning in Minimum Processing of Vegetables and Fruits", B. Ceppa, v. Curitibga. 27, n.1, p. 83-96 Jan./Jun. 2009 machine translation.

Lilia Ahrne, et al "Comparison of drying kinetics and texture effects of two calcium pretreatments before microwave-assisted dehydration of apple and potato", International Journal of Food Science and Technology, vol. 38, Issure 4, pp. 411-420, Article first published online Mar. 26, 2003.

C. Contreras, et al; "Effect of vacuum impregnation and microwave application on structural changes which occurred during air-drying of apple", LWT, vol. 38, Issue 5, pp. 471-477, Aug. 2005.

Luigi Francesco Di Cesare, et al; "Changes in the Chemical Composition of Basil Caused by Different Drying Procedures", J. Agric. Food Chem., vol. 51, Issue 12, pp. 3575-3581, Publication Date (Web): May 6, 2003.

H. Feng, et al; "Heat and Mass Transport in Microwave Drying of Porous Materials in a Spouted Bed", AlChE Journal, Jul. 2001, vol. 47, No. 7, pp. 1499-1511.

Tomas Funebo, et al; "Microwave and convective dehydration of ethanol treated and frozen apple—physical properties and drying kinetics", International Journal of Food Science and Technology, vol. 37, Issue 6, pp. 603-604, Article first published online Jul. 25, 2002.

B. Krieger-Brockett; "Microwave Pyrolysis of Biomass" Res. Chem. Intermed. vol. 20, No. 1, pp. 39-49, Jan. 1994.

M.K. Krokida, et al; "Effect of Pretreatment on Color of Dehydrated Products", Drying Technology, vol. 18, No. 6, pp. 1239-1250; Jan. 2000.

Frederic Prothon, et al; "Effects of Combined Osmotic and Microwave Dehydration of Apple on Texture, Microstructure and Rehydration Characteristics", LWT-Food Science and Technology, vol. 34, Issue 2, pp. 95-101, Mar. 2001.

Erik Torringa, et al; "Osmotic dehydration as a pre-treatment before combined microwave-hot-air drying of mushrooms", Journal of Food Engineering, vol. 49, Issues 2-3, pp. 185-191; Aug. 2001.

Bernard Wathey, et al; "The impact of microwave-assisted organic chemistry on drug discovery", Drug Discovery Today (DDT), vol. 7, No. 6, Mar. 2002, pp. 373-389.

M. Zhang, et al; "Trends in microwave-related drying of fruits and vegetables", Trends in Food Science and Technology, vol. 17, pp. 524-534, Oct. 1, 2006.

International Search Report dated Jan. 9, 2012; PCT/AU2011/001347.

Extended European Search Report issued in European Patent Office (EPO) Patent Application No. 11833642.9, dated Jul. 13, 2017.

Supplementary European Search Report issued in European Patent Office (EPO) Counterpart Patent Appl. No. 11833642.9, dated Aug. 1, 2017.

Canadian Office Action/Search Report issued in CA 2,814,964 dated Feb. 18, 2019.

Canadian Office Action/Search Report issued in CA 2,814,964 dated Jul. 5, 2018.

Canadian Office Action conducted in counterpart Canadian Appln. No. 2,814,964 (dated Oct. 8, 2019).

Office Action issued in Canada Counterpart Patent Appl. No. 2814964, dated Apr. 23, 2017.

International Preliminary Report on Patentability for PCT/AU2011/001347, dated Feb. 28, 2013.

* cited by examiner

METHOD FOR PRESERVING PLANT MATERIAL

FIELD OF THE INVENTION

The present invention relates to a method for preserving a plant material and to uses of the preserved plant material.

BACKGROUND

Plant materials having aromatic or flavour characteristics are used for a variety of purposes, including in foods, aromatherapy, perfumery and cosmetics.

Fresh plant materials typically have a short shelf life. In fresh plant materials the desirable aromatic or flavour components may be rapidly reduced through a variety of mechanisms including enzymatic browning of the plant material, or spoilage by microorganisms, especially in the case of cut or damaged plant materials.

Various approaches have been used to preserve plant materials to extend their shelf life.

One technique used is drying. For example, dried flower parts can be used to provide a fresh and pleasant aroma.

Dried herbs and spices and the like are in long established use as culinary aids. However, these products often lack aromatic and gustatory quality due to long exposure to heat during drying, as well as exposure to oxygen and light during storage. Light is also often detrimental to the appearance of such products.

Some botanicals, especially herbs and spices, have been preserved by freezing and have been marketed in large and small packs for use by industry, food service and for retail distribution. However, when thawed for use they are subject to rapid flavour, visual, enzymatic and microbiological deterioration. Further, if any unused product is re-frozen, it can form a solid mass which makes its subsequent usage difficult.

Plant materials are sometimes preserved using freeze drying techniques. However, in order to freeze dry plant material, the plant material is typically exposed to a vacuum in order to remove moisture, and this can result in the loss of a significant proportion of the aromatic and flavour components of the plant material because they are more volatile than water. Furthermore, drying under vacuum is limited to batch operations and is a relatively expensive option (especially if refrigeration is also required).

For many plant materials, especially leafy plant materials, the preserving process such as heat or air drying, freeze drying or freezing substantially affects the appearance, e.g. colour, or physical properties of the plant material which can limit the uses of the preserved plant material.

Di Cesare et al. (J. Agric. Food Chem., 2003, 51, 3575-3581) describes the use of controlled, multi-step, microwave exposure as a means for drying basil leaves to less than 10% moisture without significant damage to the herb by burning. The characteristic volatile components of basil were measured in the microwave dried basil and found to be within the proportions of volatile components in dried basil produced by alternate existing methods.

It would be advantageous to provide an alternative method of preserving plant materials.

SUMMARY OF THE INVENTION

In a first aspect, the present invention provides a method for preserving a plant material. The method comprises steps (a) and (b):

(a) applying a composition comprising a microwave attractant to the plant material; and then (b) drying the plant material while exposing the plant material to microwave energy, wherein the microwave energy heats the plant material to a temperature effective to inactivate the majority of any browning enzymes in the plant material, and wherein the microwave attractant results in the heating of the plant material occurring at a rate whereby browning of the plant material by the browning enzymes during heating is substantially prevented.

The inventors' initial attempts to preserve plant material by drying the plant material using microwave energy to heat the plant material resulted in preserved plant material having properties comparable to those using existing drying processes (including following the teachings of Di Cesari et al.). However, following extensive research and development, the inventors surprisingly discovered that if a composition comprising a microwave attractant was applied to the plant material before it was exposed to microwave energy, then a preserved plant material having significantly improved properties could be produced.

A microwave attractant (sometimes referred to as a susceptor) is a substance that attracts and concentrates microwave energy. In the method of the present invention, the microwave attractant applied to the plant material concentrates the microwave energy on and within the plant material, resulting in a more rapid heating of the plant material to a temperature effective to inactivate the majority of any browning enzymes in the plant material (as well as other potentially deleterious enzymes present in the plant material) than would occur in the absence of the microwave attractant. This accelerated heating reduces browning of the plant material by the browning enzymes during heating compared to processes in which the plant material is heated at a less rapid rate (browning enzymes typically become more active as they are heated). In the method of the present invention, the accelerated heating of the plant material occurs at a rate whereby browning of the plant material is substantially prevented. Further, the accelerated heating also results in the moisture level of the plant material being reduced more rapidly than would otherwise be the case, which may enable the preserved plant material to retain more of its desirable properties compared to plant materials dried by microwave drying in the absence of the microwave attractant. As the majority of the browning enzymes in the plant material are inactivated by the heating of the plant material, browning of the plant material is unlikely to occur post-treatment.

For example, the method of the present invention can be used to preserve a plant material while retaining to a substantial extent its fresh aromatic/flavour properties in both quality and quantity, as well as its natural colour and appearance. The preserved plant material can also retain the physical integrity of its tissues to a greater degree than that in plant materials preserved using existing methods (including existing microwave drying methods).

The inventors have found that the method of the present invention can be used to preserve edible plant materials in a manner that results in a preserved plant material having a tender eating/mouth feel quality and a rapid aroma/flavour release. This is in stark contrast to existing conventionally dried herbs and spices, which often have a dry and tough mouth feel, as well as very slow and limited aroma/flavour release.

In some embodiments, the composition is an aqueous composition.

In some embodiments, the composition comprises an oil (e.g. olive oil, canola oil, sunflower oil, rice bran oil, or a mixture thereof). The inventors have found that using a composition comprising an oil provides an unexpected benefit in that during heating, the oil can trap and retain volatile aromatic and/or flavourful components of the plant material (both in quantity and quality) that are otherwise volatilised and lost during heating. Without wishing to be bound by theory, the inventors believe that the normally highly volatile aromatic and/or flavourful elements in the fresh plant material (e.g. its essential oils) are absorbed or sequestered by the oil during the heating and drying of the plant material. The inventors have also found that the oil assists in retaining these aromatic and/or flavourful elements in the preserved product during subsequent storage, so that these elements can be experienced essentially unchanged and in full in an ultimate usage.

In some embodiments, the microwave attractant comprises an at least partially water-soluble salt. In some embodiments, the microwave attractant comprises an at least partially water-soluble mineral salt. In some embodiments, the microwave attractant comprises an at least partially water-soluble salt having a cation selected from the group consisting of: sodium, magnesium, potassium and calcium. In some embodiments, the microwave attractant comprises sodium chloride. In some embodiments, the microwave attractant may comprise two or more at least partially water-soluble salts. The composition may, for example, be applied to the plant material in an amount which provides between about 0.1% to about 20% by weight of microwave attractant to the plant material, based on the total weight of the plant material before application of the composition to the plant material.

In a second aspect, the present invention provides a method for preserving a plant material. The method comprises steps (a) and (b):
(a) applying to the plant material a composition comprising an at least partially water-soluble salt; and then
(b) drying the plant material while exposing the plant material to microwave energy, wherein the microwave energy heats the plant material to a temperature effective to inactivate the majority of any browning enzymes in the plant material.

In some embodiments, the composition comprises 0.5% to 55% by weight of an at least partially water-soluble salt or mixture of at least partially water-soluble salts.

In some embodiments, the composition is applied to the plant material in an amount which provides between about 0.1% to about 20% by weight of the salt(s) to the plant material, based on the total weight of the plant material before application of the composition to the plant material.

In some embodiments, the composition comprising an at least partially water-soluble salt is an aqueous composition.

In some embodiments, the composition comprising an at least partially water-soluble salt also comprises an oil (e.g. olive oil, canola oil, sunflower oil, rice bran oil, or a mixture thereof).

In a third aspect, the present invention provides a method for preserving a plant material. The method comprises steps (a) and (b):
(a) applying to the plant material a composition comprising an oil; and then
(b) drying the plant material while exposing the plant material to microwave energy, wherein the microwave energy heats the plant material to a temperature effective to inactivate the majority of any browning enzymes in the plant material.

In some embodiments, the composition comprising an oil also comprises an at least partially water-soluble salt. In some embodiments, the composition comprising an oil also comprises 0.5% to 55% by weight of an at least partially water-soluble salt or mixture of at least partially water-soluble salts. In some embodiments, the composition is applied to the plant material in an amount which provides between about 0.1% to about 20% by weight of the salt(s) to the plant material, based on the total weight of the plant material before application of the composition to the plant material.

Plant materials may comprise a number of different browning enzymes in different proportions. During step (b) of the methods of the present invention, the plant material is heated to a temperature effective to inactivate the majority of all the browning enzymes present in the plant material. Typically, substantially all of the browning enzymes in the plant material are inactivated in step (b).

In some embodiments, the plant material is heated during step (b) to a temperature effective to inactivate the majority of any polyphenol oxidase (the primary enzyme responsible for causing browning of many plant materials) in the plant material. If the majority of any polyphenol oxidase in the plant material is inactivated, then other detrimental enzymes such as lipases and oxidases will also be inactivated. The plant material may, for example, be heated during step (b) to a temperature of above about 80° C. for a time of at least about 30 seconds.

In some embodiments, the moisture content of the plant material is reduced during step (b) by more than 15% (e.g. more than 35%) in less than 3 minutes.

In some embodiments, during step (b) the plant material is exposed to between about 10 to about 100 watts of microwave energy per gram of plant material, for between about 1 and about 3 minutes. In some embodiments, the intensity of the microwave energy may be substantially constant for the duration of the exposure. Alternatively, in some embodiments, the intensity of the microwave energy may be progressively reduced or increased over the duration of the exposure.

In some embodiments, during step (b) air is caused to flow over the plant material during its exposure to the microwave energy. Such a flow of air assists in removing moisture that has been driven out of the plant material as it is heated.

In some embodiments, the plant material is dried during step (b) to a moisture content at which microbial growth is substantially inhibited. A moisture content such that the plant material has a water activity of less than 0.91 is typically suitable to inhibit microbial growth. In some embodiments, the plant material is dried during step (b) to a moisture content at which ice crystals will not form inside the preserved plant material when it is cooled to freezing temperatures of below 0° C. (e.g. about −18° C., which is the temperature of commercial freezers). A moisture content in the range of about 25% to about 70% (by weight) is typically suitable to avoid ice crystals forming inside the preserved plant material when cooled to a temperature of about −18° C. The preserved plant material having such a moisture content can be stored in a domestic or commercial freezer at temperatures of 0° C. to −18° C. to further preserve the plant material, and remains soft and flexible/pliable when stored under such conditions. Providing a preserved plant material with such a moisture content enables it to remain soft and flexible/pliable, even after multiple freezing/thawing cycles. Furthermore, such a preserved plant material would not tend to freeze into a solid block or clump if warmed to ambient temperature and then returned to freezer temperatures.

Indeed, such a preserved plant material would be free flowing when taken out of a freezer.

In some embodiments, the method of the present invention also comprises the step of further drying the preserved plant material (i.e. plant material which has undergone step (b)) to produce a substantially dried plant material that is storage stable for an extended period outside of a freezer, for example, at room temperature for at least 6 months or at temperatures of about 4° C. (i.e. in a refrigerator) for at least 3 months. The moisture content of the substantially dried plant material may, for example, be less than about 12% (by weight). In some embodiments, the moisture content may be less than about 10% (by weight). In some embodiments, the moisture content may be between about 13% and about 24% (by weight). The preserved plant material may be further dried by exposing it to additional microwave energy or using other known drying techniques such as air drying, vacuum drying, heat pump drying or freeze drying.

In some embodiments, the composition is applied to the plant material by spraying the composition over the plant material or dipping the plant material into the composition, and then, optionally, tumbling the mixture of the plant material and composition.

In a fourth aspect, the present invention provides a product (e.g. a herb pesto sauce, a pharmaceutical or a cosmetic) comprising a plant material treated by the method of the first, second or third aspect.

In a fifth aspect, the present invention provides a preserved plant material comprising at least 60% of the essential oils present in the fresh plant material from which the preserved plant material was prepared. The preserved plant material has a water activity of less than 0.91 and the majority of browning enzymes present in the fresh plant material from which the preserved plant material was prepared have been substantially inactivated.

In a sixth aspect, the present invention provides a preserved plant material that has substantially the same colour as the fresh plant material from which the preserved plant material was prepared. The preserved plant material has a water activity of less than 0.91 and the majority of browning enzymes present in the fresh plant material from which the preserved plant material was prepared have been substantially inactivated.

In a seventh aspect, the present invention provides an emulsion for preserving a plant material. The emulsion comprises (by weight) between 2-50% (e.g. 8-50%) sodium chloride; between 1-14% (e.g. 3-14%) sodium hydroxide, sodium carbonate, sodium bicarbonate, sodium phosphate or combinations thereof; between 0.5-14% (e.g. 3-14%) sodium erythorbate, ascorbic acid or sodium ascorbate; between 5-40% (e.g. 13-40%) oil; between 0.1-0.5% soy lecithin; and the balance water.

In an eighth aspect, the present invention provides a method for preserving plant material. The method comprises steps (a) to (c):
(a) providing a composition comprising a mineral salt dispersed in a carrier selected from an aqueous carrier, an oil based carrier and a carrier which is a mixture of aqueous and oil components;
(b) applying the composition to the plant material in an amount in the range of from 0.25 g to 20 g of mineral salt per 100 g of plant material; and
(c) drying the plant material comprising exposing the plant material and applied composition to microwave energy to heat the plant material to a temperature effective to inactivate the majority of browning enzymes in the plant material.

In a ninth aspect, the present invention provides a dried preserved plant material prepared according to the method of the eighth aspect.

In a tenth aspect, the present invention provides a dried preserved plant material comprising: a water activity of less than 0.91; a majority of browning enzymes inactivated; a content of mineral cation selected from the group consisting of sodium, potassium, magnesium and calcium is in the range of from 0.1% to 10% by weight cation based on the weight of the preserved plant material.

DETAILED DESCRIPTION OF THE INVENTION

As discussed above, the present invention provides a method for preserving a plant material. The method comprises steps (a) and (b):
(a) applying a composition comprising a microwave attractant to the plant material; and then
(b) drying the plant material while exposing the plant material to microwave energy, wherein the microwave energy heats the plant material to a temperature effective to inactivate the majority of any browning enzymes in the plant material, and wherein the microwave attractant results in the heating of the plant material occurring at a rate whereby browning of the plant material by the browning enzymes during heating is substantially prevented.

The method of the present invention can be used to extend the shelf life of a plant material, whilst at the same time retaining to a substantial extent the colour and fresh aromatic/gustatory properties of the original plant material, as well as the physical integrity of the tissues of the plant material.

Surprisingly, the presence of microwave attractants in the composition applied to the plant material results in a degree and effectiveness of enzyme inactivation during exposure to microwave energy which has not been achievable in comparable time-frames by traditional means for inactivating enzymes in plant materials (e.g. blanching with steam).

There are many plants which provide a source of prized aromatic and/or flavourful components. Further, many plants contain volatile medicinal components. Such components are typically localised in certain parts of the plant. For example, in many flowering plants such as roses, lilac, boronia and freesia (just to name a few) certain aromatic components are located in the flowers. In plants used for food or seasoning purposes, the aromatic and/or flavouring components may be located in various plant parts such as the leaves of culinary herbs, the rhizomes of ginger, the leaf bases or bulbs of *Allium* spp. and in some flower parts and seeds.

The plant material for use in the methods of the present invention may, for example, be a leaf, flower, stem, root, rhizome, bulb, bud, pod, skin or zest. For example, the plant material may be a flower petal, herb or spice, which could either be provided in the form of a substantially integral plant part (e.g. an entire leaf of a herb) or sliced to increase the surface area of the plant material (e.g. slices of ginger). Care must be taken, however, if the integral nature of the plant material is destroyed (e.g. by slicing) before preservation, because this may cause detrimental enzymatic reactions. For this reason, if the plant material is to be sliced or cut prior to preserving by the method of the present invention, the plant material is typically sliced or cut shortly before the plant material is preserved by the method of the present invention. The preserved plant material can, however, be further reduced in size after processing.

Most plant materials are perishable and have a short life after harvest, losing their prized aromatic and/or flavourful properties as they perish. The present invention enables these prized components to be retained in the preserved plant material. The present invention further enables a greater proportion of the appearance (e.g. colour) and physical properties of the plant material (e.g. texture and mouth feel) to be retained during the preserving process than many prior art preserving processes.

Examples of plant materials suitable for use in the methods of the present invention include herbs or spices selected from the group consisting of basil, bay leaf, coriander, chilli, chives, chervil, dill, garlic, ginger, galangal, lemongrass, mint, marjoram, oregano, parsley, rosemary, sage, thyme and tarragon.

Step (a)

In step (a), a composition comprising a microwave attractant is applied to the plant material.

The composition comprising a microwave attractant may be an aqueous composition, an oleaginous composition, a mixture of an aqueous composition and an oleaginous composition or an emulsion having aqueous and oleaginous phases.

When the composition comprising a microwave attractant includes an oil, any oil that will retain aromatic and/or flavourful components of the plant material throughout the method of the invention (i.e. steps (a) and (b)) may be used. An oleaginous coating may comprise a single oil or a mixture of oils. For plant materials intended for food applications, the oil may be of plant or animal origin or synthesised (e.g. one or a mix of vegetable oils). Vegetable oils are preferred. For plant materials not intended for food applications, any type of oil may be used, provided it can contain and retain the aromatic and/or flavourful components of the plant materials. While not essential, it is preferred that the oil(s) in the composition remain liquid or semi-liquid at the proposed storage temperatures of the preserved plant material. Examples of suitable oils include olive oil, canola oil, sunflower oil, rice bran oil, coconut oil, corn oil, cottonseed oil, palm oil, peanut oil, rapeseed oil, safflower oil, sesame oil, soybean oil and mixtures of two or more thereof.

In some embodiments, the composition may comprise a solvent, other than an oil, having a low volatility and which is capable of retaining the aromatic and/or flavourful components of the plant material. Such a solvent may be the only solvent in the composition, or may be present in the composition with water and/or an oil.

The composition applied to the plant material includes one or more microwave attractants. The microwave attractant(s) cause the microwave energy to which the plant material is exposed during drying to be concentrated on and in the plant material. This concentration of microwave energy causes the plant material to be heated more rapidly to a temperature effective to inactivate the majority of any browning enzymes (as well as other deleterious enzymes) in the plant material than would be the case if the composition had not been applied to it, thus enabling shorter exposure times and the advantages discussed above.

Many substances act as microwave attractants (microwave attractants are commonly referred to as susceptors). For example, water and oils are microwave attractants. However, certain substances have a greater microwave attracting power than others. For example, many ionic species are known to be effective microwave attractants. In particular, ions of sodium, potassium, magnesium and calcium salts are relatively strong microwave attractants. Oils are also relatively strong microwave attractants. Any microwave attractant that, when applied to the plant material and when exposed to microwave energy, results in heating of the plant material occurring at a rate whereby browning of the plant material by any browning enzymes in the plant material is substantially prevented may be used in the present invention. Relatively strong microwave attractants are preferred as less microwave attractant is required to result in such heating of the plant material. When the preserved plant material is intended for culinary use, the microwave attractant is preferably an edible, non-toxic substance.

In some embodiments, the microwave attractant comprises an at least partially water-soluble salt. Such salts are also advantageous because the plant material tends to draw the ions of the salts from the exterior of the plant material to which they have been applied into the plant material via diffusion and/or osmosis, thereby more evenly distributing the microwave attractant throughout the plant material. In some embodiments, the microwave attractant may comprise an ionising acid or ionising alkali.

The at least partially water-soluble salt typically has a water solubility greater than about 0.1 g per 100 mL of water. More typically, the at least partially water-soluble salt has a water solubility greater than about 1 g per 100 mL of water.

The salt may be partially or completely dissolved in the composition applied to the plant material (e.g. if the composition is an aqueous composition), or dispersed in the composition applied to the plant material (e.g. if the composition is an oleaginous composition).

In some embodiments (especially where the preserved plant material is intended for food applications), the microwave attractant comprises an at least partially water-soluble mineral salt. In some embodiments, the microwave attractant comprises an at least partially water-soluble salt having a cation selected from the group consisting of: sodium, magnesium, potassium and calcium. The microwave attractant may, for example, comprise sodium chloride, potassium chloride, calcium chloride and/or magnesium chloride.

In some embodiments, the microwave attractant may comprise two or more at least partially water-soluble salts. In some embodiments, the composition applied to the plant material may include two or more microwave attractants, for example, oil and one or more at least partially water-soluble salts.

As mentioned above, some oils are themselves microwave attractants. Accordingly, in some embodiments, the composition comprising a microwave attractant may simply be an oil (e.g. olive oil, canola oil, sunflower oil, rice bran oil and mixtures thereof).

A convenient and inexpensive microwave attractant for use in the present invention, especially if the preserved plant material is ultimately for human or animal consumption, is sodium chloride, potassium chloride or calcium chloride (or a combination thereof). However, as those skilled in the art would appreciate, a number of alternative at least partially water-soluble salts could readily be used in place of (or in addition to) sodium chloride, potassium chloride or calcium chloride without affecting the method of the present invention. For example, other electrolytes (e.g. $MgCl_2$, various phosphate, sulphate or other soluble salts) can be used in the composition for the preservation of plant materials in a range of applications.

In embodiments where the microwave attractant comprises an at least partially water-soluble salt or mixture of at least partially water-soluble salts, the composition may, for example, comprise between about 0.5 to about 55% (by weight), e.g. from about 0.8 to about 55%, from about 1.0 to about 50%, from about 2.0 to about 50% or from about 1.5 to about 40%, of the at least partially water-soluble salt(s). In some embodiments, the composition comprises between about 2% to about 15%, for example, about 5% to about 10% (by weight) of the at least partially water-soluble salt(s). In some embodiments, the composition comprises between about 10% to about 15%, for example, about 10% to about 25% (by weight) of the at least partially water-soluble salt(s).

In some embodiments, the composition applied to the plant material is an oil-in-water emulsion comprising about 5-55% by weight of a mineral salt(s) (e.g. about 5 to 40%, about 8 to 40% or about 10 to 40%) and about 4-80% (e.g. about 6-45% or about 15 to 35%) by weight of oil.

In embodiments in which the at least partially water-soluble salt or mixture of at least partially water-soluble salts is dissolved in the composition applied to the plant material, it is appropriate to refer to the molal concentration of the salt(s) in the composition. The molal concentration of such salt(s) can, for example, be in the range of about 0.10 to about 35 molal (moles/kg) (e.g. about 0.20 to about 35 molal, about 0.40 to about 15 molal, about 0.14 to about 15 molal, and more specifically about 2 to about 10 molal).

In some embodiments, the composition applied to the plant material is an oleaginous composition comprising about 8-55% by weight (e.g. about 8% to 30% or about 15% to 25%) of a mineral salt.

The amount of the microwave attractant present in the composition and applied to the plant material will depend on numerous factors such as the type of plant material, the amount of the composition applied to the plant material which is retained on the plant material for step (b), and the microwave attracting ability of the microwave attractant. These parameters can be determined by a person skilled in the art, but by way of example only, the composition may be applied to the plant material in an amount which provides between about 0.1% to about 50% (e.g. about 0.1% to about 20%, about 0.25% to about 20%, about 1% to about 15%, or about 2.5% to about 10%) by weight of microwave attractant to the plant material, based on the total weight of the plant material before application of the composition to the plant material. When the microwave attractant is an at least partially water-soluble salt, the microwave attractant is applied to the plant material in an amount which provides between about 0.1% to about 20% by weight of microwave attractant to the plant material, based on the total weight of the plant material before application of the composition to the plant material. The inventors have found that the amount of the composition applied to the plant material which is retained on the plant material depends on factors including the viscosity of the composition and the technique used to apply the composition to the plant material (e.g. dip coating or spray coating, continuous or batch operations). However, the inventors have found that for many compositions and plant materials, between about 30% and about 100% (by weight) of the composition applied to the plant material is usually retained on the plant material. For example, when using continuous operations, close to 100% of the composition applied to the plant material is retained by the plant material for step (b).

Depending on the type of plant material, it may be beneficial to adjust the pH of the composition applied to the plant material and/or the preserved plant material. For example, if it is desired to preserve and/or enhance the organoleptic qualities (e.g. tenderness) of the preserved plant material, the presence of pH modifier(s) on the plant material (in the coating applied to the plant material) during exposure to microwave energy may provide a tenderizing effect. Furthermore, for certain aromatic plant materials, a reduction or elevation in pH may facilitate the retention of particular colour, flavour and/or textural qualities during the preservation process.

Accordingly, in some embodiments, the composition applied to the plant material also includes one or more pH-modifying agents, for example, an alkalinizing salt (e.g. sodium hydroxide, sodium carbonate, sodium bicarbonate, sodium phosphate or combinations thereof), an acidulating salt or acids of various types (e.g. citric acid, ascorbic acid, acetic acid, thio-containing acids and salts, sodium di hydrogen phosphate, sodium acid pyrophosphate). Obviously, when the plant material is intended for consumption by a person, the pH-modifying agent must be a substance acceptable to food authorities.

Examples of alkali pH-modifying agents may be selected from the group consisting of: sodium acetate, sodium diacetate, calcium acetate, sodium citrate, sodium dihydrogen citrate, calcium citrate, and potassium citrate, potassium dihydrogen citrate, sodium fumerate, calcium fumerate, and potassium fumerate, sodium gluconate, calcium gluconate, magnesium gluconate and potassium gluconate, sodium hydroxide, calcium hydroxide, potassium hydroxide, sodium lactate, calcium lactate, magnesium lactate and potassium lactate, sodium malate, sodium hydrogen malate, calcium malate, potassium malate, sodium phosphate, sodium dihydrogen phosphate, calcium phosphate, calcium dihydrogen phosphate, magnesium phosphate, potassium phosphate, potassium dihydrogen phosphate, sodium tartrate, calcium tartrate, and potassium fumerate, sodium carbonate, calcium carbonate, and potassium carbonate, sodium bicarbonate, potassium bicarbonate, sodium hydrogen carbonate, sodium acid pyrophosphate, and combinations thereof.

Examples of acid pH-modifying agents may be selected from the group consisting of: acetic acid, adipic acid, citric acid, fumaric acid, gluconic acid, hydrochloric acid, lactic acid, malic acid, metatartaric acid, phosphoric acid, succinic acid, sulphuric acid, tartaric acid, glucono delta lactone, lemon juice, and combinations thereof.

The amount of the pH-modifying agent present in the composition and applied to the plant material will depend on numerous factors such as the type of plant material and desired pH. These parameters can be determined by a person skilled in the art, but by way of example only, the composition may comprise from about 0.75 to about 18% (by weight), e.g. from about 0.75 to about 14%, from about 1 to about 14% or from about 1.5 to about 10%, of the pH-modifying agent.

Some pH-modifying agents are also microwave attractants. In some embodiments therefore, one substance in the composition applied to the plant material may act as both a microwave attractant and pH-modifying agent.

Sufficient of the one or more pH-modifying agents are included in the composition to achieve a desired pH in the composition and/or in the preserved plant material. The composition may, for example, contain one or more alkalinizing salts at a suitable concentration to cause the aqueous phase of the composition to have a pH of about 7.5-9.5 (e.g. about 7.8-8.7 or 8.0-8.5). The composition may contain acidulating salts at a suitable concentration to cause the aqueous phase of the composition to have a pH of about 3.0-6.5 (e.g. about 4.0-5.0).

In some embodiments, the composition applied to the plant material also includes an antioxidant. Antioxidants can provide a number of beneficial effects such as reducing oxidation of desirable aromatic oils, vitamins and colour components of the plant material, as well as aiding in maintaining flavour, colour and texture during preservation and subsequent storage. The composition may, for example, contain an antioxidant in an amount to provide between about 0.05 to about 3.0 g (e.g. about 1.0 to about 2.0 g) antioxidant per 100 g of the plant material (based on the total weight of the plant material before application of the composition to the plant material). In some embodiments, the composition comprises about 0.5% to about 14% (e.g. about 0.75% to about 14%, about 2% to about 14% or about 1.5% to about 8%) by weight of an antioxidant.

Examples of antioxidants may be selected from the group consisting of: ascorbic acid; sodium, calcium or potassium ascorbate; erythorbic acid; erythorbin acid; sodium, calcium or potassium erythorbate; citric acid; tartaric acid; lemon juice; glucono delta lactone; potassium gluconate; tocopherols; BHA; BHT; ascorbyl palmitate, ascorbyl stearate; sodium metabisulphite; propyl gallate; beta carotene, polyphenols and thiols and the like, and mixtures of two or more thereof.

Some antioxidants are also microwave attractants. In some embodiments therefore, one substance in the composition applied to the plant material may act as both a microwave attractant and an antioxidant.

In some embodiments, the composition applied to the plant material also includes one or more emulsifiers. When the composition comprises water and an oil, the composition will typically include an emulsifier. While the emulsifier is not essential to the performance of the invention, it is helpful in ensuring that the composition applied to the plant material is uniformly spread over the plant material in embodiments in which the composition contains both oil and water. In addition, emulsifiers act as dispersing agents in both aqueous and oleaginous phases and therefore in embodiments in which the composition contains both oil and water, the emulsifier may aid in the retention of volatile aromatic oil soluble components as well as aqueous soluble components.

Specific examples of emulsifiers may be selected from the group consisting of: lecithin; mono- and diglycerides of fatty acids; acetylated monoglycerides, diacetyl tartaric acid esters of mono- and diglycerides, ethoxylated mono- and diglycerides, succinylated monoglycerides; acetic and fatty acid esters of glycerol; lactic and fatty acid esters of glycerol; fatty acids, lactylic esters of fatty acids, polyglycerol esters of fatty acids and glyceryl-lacto esters of fatty acids; polyglycerol esters of fatty acids; ammonium polyphosphate, calcium polyphosphate, dicalcium diphosphate, disodium diphosphate, disodium orthophosphate; gelatin; potassium polyphosphates, sodium polyphosphate; stearyl citrate sucroglycerides; sucrose acetate isobutyrate; sucrose esters of fatty acids; tetrapotassium diphosphate; sodium lauryl sulphate; emulsifying salts; palmitates, stearates, pectin, oleates, tartrates and polysorbates. One class of emulsifiers the inventors have found useful (especially in food applications) are lecithins (e.g. soy lecithin). The composition may for example contain the emulsifier(s) in an amount to provide between about 0.001 to about 5 g (e.g. about 0.001 to about 0.5 g, about 0.001 to about 1.5 g or about 0.01 to about 0.30 g) emulsifier per 100 g plant material (based on the total weight of the plant material before application of the composition to the plant material). In some embodiments, the composition comprises between about 0.001% to about 5% (e.g. about 0.001% to about 1%, about 0.001% to about 1.5%, about 0.001% to about 0.5%, about 0.1% to about 0.5% or about 0.025% to about 1.5%) by weight of emulsifier.

Some emulsifiers are also microwave attractants. In some embodiments therefore, one substance in the composition applied to the plant material may act as both a microwave attractant and an emulsifier.

Stabilisers other than emulsifiers may also be useful in the composition applied to the plant material. Examples of stabilisers other than emulsifiers may be selected from the group consisting of: xanthan gum, guar gum, gum Arabic, gellan gum, carrageenan, carob been gum, tragacanth gum, sucrose ester, propylene glycol alginate, cellulose gum, ethyl hydroxyethyl cellulose, methyl cellulose, methyl ethyl cellulose, hydroxypropylmethylcellulose, microcrystalline cellulose, modified starches, pectin and mixtures of two or more thereof.

In particular embodiments, a plant material (e.g. basil leaves) is coated with a composition comprising a mixture of one or more oils (which may be a microwave attractant or not), one or more microwave attractants, optionally one or more pH-modifying agents (which may be a microwave attractant or not), optionally one or more antioxidants (which may be a microwave attractant or not), an emulsifier (which may be a microwave attractant or not) and water.

Exemplary compositions comprising a microwave attractant include the following:

(1) An emulsion comprising (by weight):
  sodium chloride (0.5-55%); sodium bicarbonate (0.75-14%); sodium erythorbate or ascorbic acid (0.75-14%); olive oil (4-40%); soy lecithin (0.001-0.5%); and water (to 100%).

(2) An oleaginous composition comprising (by weight):
  sodium chloride (4-55%); sodium bicarbonate (4-14%); sodium erythorbate (2-14%); soy lecithin (0.025-1.5%); and oil (to 100%).

(3) An emulsion comprising (by weight):
  sodium chloride (9.82%); sodium bicarbonate (7.86%); sodium erythorbate (7.86%); oil (19.65%); soy lecithin (0.59%); and water (54.22%).

(4) An emulsion comprising (by weight):
  sodium chloride (8.87%); sodium bicarbonate (16.63%); ascorbic acid (7.27%); oil (17.74%); soy lecithin (0.53%); and water (48.95%).

As all of the ingredients in composition (4) are classified as organic ingredients, preserved plant materials prepared using composition (4) could be certified as organic produce.

The composition comprising a microwave attractant may be applied to the plant material, either before or after any trimming (e.g. de-stalking, peeling etc) of the plant material, by spraying the composition over the plant material or dipping the plant material into the composition, and then optionally tumbling the mixture of the composition and plant material. Preferably, the amount of composition applied is sufficient to coat the surfaces of the plant material without any excess composition remaining. That is, the composition is completely adsorbed onto the surfaces of the plant material, with essentially no composition dripping or draining away. For example, in continuous operation, a steady state can be obtained in which 100% of the composition applied to the plant material is retained on the plant material for step (b). However, in a batch operation, some of the composition applied to the plant material may not be retained on the plant material, and the proportion of composition lost may need to be allowed for.

Step (b)

In step (b), the plant material is dried while being exposed to microwave energy which heats the plant material to a temperature effective to inactivate the majority of any browning enzymes in the plant material. The microwave attractant results in the heating of the plant material occurring at a rate whereby browning of the plant material by the browning enzymes during heating is substantially prevented.

As noted above, the microwave attractant(s) concentrate the supplied microwave energy directly onto and into the plant material, which causes its temperature to increase rapidly. Inactivation of enzymes in a plant material will usually occur if the plant tissues are heated to a temperature in excess of about 80° C., for example about 80-95° C., about 80-90° C. or about 85-90° C., for a sufficient period of time. For many plant materials, heating to this temperature for a time of in excess of 30 seconds is sufficient to inactivate the majority of any browning enzymes in the plant material. For many plant tissues it is very important to inactivate these enzymes because residual enzyme activity may result in off-odours, off-flavours and/or off-colours following storage of the plant material. Inactivating the browning enzymes therefore acts to preserve aromatic, flavour and colour characteristics of the plant material. The inventors have found that if the plant material is heated to a temperature effective to inactivate the majority of any browning enzymes in the plant material, then substantially all of the other enzymes which may cause undesirable effects will also be inactivated.

Browning enzymes found in plant materials and which may cause undesirable effects include:
  polyphenol oxidase, which catalyses the oxidation of phenols into unstable substrates which then go on to catalyse non-enzymic browning reactions and polymerisation reactions to form melanins which are brown to black and often are accompanied by detrimental textural changes like firming and a bitter taste.
  lipoxygenase, which catalyses lipid oxidation with the formation of several undesirable outcomes including the destruction of chlorophyll and carotenoids (colours/vitamins) leading to browning, development of oxidated off-flavours and aromas, oxidative damage to vitamins and proteins and finally causing the oxidation of essential fatty acids as well as oxidative rancidity and generation of highly reactive free radicals which in turn catalyse other browning reactions and flavour and aroma degradation.
  chlorophyllase, which hydrolyses the phytyl group from chlorophyll giving phytol and chlorphyllide and a concomitant loss of green colour.

Other non-desirable plant enzymes which are preferably substantially inactivated by the method of the present invention include texture modifying enzymes such as pectinesterase and polygalacturonase, which cause undesirable softening of the plant tissue; cellulase, pentosanases and amylases, which can affect texture and colour; and proteases, which can cause off-flavour development.

Rapid enzyme inactivation is beneficial because it reduces the time during which enzyme activity could occur whilst the temperature is favourable for reactions between available substrates and enzymes in the tissues of the plant material. The inventors' experiments indicate that the enzyme inactivation achievable by the method of the present invention is more rapid and effective than existing blanching processes used to inactivate enzymes (e.g. using steam or by immersion in hot water).

In some embodiments, the plant material is heated during step (b) to a temperature effective to inactivate the majority of any polyphenol oxidase (the primary enzyme responsible for browning) in the plant material. If the plant material is heated to a temperature effective to inactivate the majority of any polyphenol oxidase, then substantially all of the other enzymes which may cause undesirable effects will also be inactivated.

The microwave energy preferably heats the plant material in as short a time as possible, but without causing any significant degree of burning of the plant material. The plant material may, for example, be heated during step (b) to a temperature effective to inactivate the majority of any browning enzymes in the plant material (e.g. to about 80° C.) within about 1 to about 3 minutes (e.g. about 1 to about 2 minutes or 1 minute or less, for example, about 30 seconds or about 45 seconds to about 1 minute). This heating regimen may vary depending on the nature of the plant material and a person skilled in the art could readily establish the most appropriate temperature and time for any particular plant material.

In the method of the present invention, the plant material is at least partially dried. Reducing the moisture content of the plant material will inhibit microorganism growth on the plant material. In the method of the present invention, during at least part of the drying of the plant material, microwave energy is applied to the plant material to heat the plant material. The microwave energy heats the plant material to a temperature effective to inactivate browning enzymes in the plant material. The heating of the plant material also drives out moisture from the plant material resulting in drying of the plant material. The plant material should ideally be dried as rapidly as possible in order to retain as much of the desirable aromatic and flavour properties of the plant material as possible, but not so rapidly that burning or other undesirable problems occur. In some embodiments, the moisture content of the plant material may be reduced during step (b) by more than about 15% in less than about 10 minutes (e.g. in less than about 5 minutes or in less than about 3 minutes). In some embodiments, the moisture content of the plant material may be reduced during step (b) by more than about 35% in less than about 20 minutes (e.g. in less than about 10 minutes or in less than about 5 minutes or in less than about 3 minutes).

The intensity of microwave energy to which the plant material is exposed will affect the rate at which the plant material is heated. The microwave intensity and the duration of exposure required will vary depending on the nature of the particular plant material, and can be determined by a person skilled in the art. However, in some embodiments, the plant material may be exposed to between about 10 to about 100 watts microwave energy per gram of plant material (e.g. about 20 to about 50 watts), for between about 0.5 and about 20 minutes (e.g. from about 1 to about 5 minutes, from about 0.5 to about 5 minutes or from about 1 to about 3 minutes).

The intensity of the microwave energy may be substantially constant for the duration of the exposure, or may be varied throughout the exposure (e.g. the intensity of the microwave energy may be progressively reduced or increased over the duration of the exposure, or the microwave energy may be otherwise varied over the duration of the exposure). As more specialised equipment is required to vary the intensity of the microwave energy, and as the length of time required to dry the plant material would be increased if relatively lower microwave intensity was used, in some embodiments, a single microwave energy setting is used. In other embodiments, however, it may be desirable to slowly decrease the intensity of the microwave energy over the duration of the exposure. Such a treatment regimen may help prevent the plant material from overheating and burning as it dries.

The microwave exposure may be performed on plant material in either a continuous or a batch basis, and may be performed at ambient air pressure conditions.

In some embodiments, air is caused to flow over the plant material during its exposure to the microwave energy. The moisture driven out of the plant material as it is heated becomes entrained in the airflow and removed from the atmosphere surrounding the plant material. In this way, the relative humidity surrounding the drying plant material remains approximately constant and a beneficially rapid rate of drying can be achieved.

The plant materials can be placed on a conveyor belt (or the like) in a shallow layer, and then passed through a zone in which they are subjected to high intensity microwave energy in association with air ventilation to achieve the required degree of drying and enzyme inactivation.

Advantageously, the method of the present invention does not necessarily require refrigeration or freezing in order to dry and preserve the plant material. Freezing is a common feature of many existing apparatuses and processes for preserving plant material, and increases the cost and complexity of such processes.

The plant material is typically dried during step (b) to a water activity at which microbial growth is substantially inhibited. As those skilled in the art will appreciate, inhibiting microbial growth will enable the plant material to be stored for extended periods of time without any spoilage occurring. In some embodiments, the preserved plant material may be packaged and stored for a number of months at refrigerator temperatures (i.e. about 4° C. to about 10° C.) without any microbial activity or flavour or colour degradation. In some embodiments, the preserved plant material may be stored at freezer temperature (e.g. −18° C.) for two years or longer without excessive browning or colour deterioration, loss of colour or aroma.

The water activity of a plant material is the partial pressure of water in the plant material divided by the saturation pressure of water at the same temperature. Substances having a higher water activity tend to support more microorganisms, for example, most bacteria usually require a water activity of at least 0.92 and fungi at least 0.7. Typically, in the method of the present invention, the plant material is dried to a water activity of below 0.91.

The moisture content of the plant material may be reduced to a level such that ice crystals will not form inside the preserved plant material when it is cooled to a freezer storage temperature (e.g. from about −5° C. to about −18° C.). Such a preserved plant material will remain soft and flexible/pliable when stored in a freezer. Furthermore, when stored at freezer temperatures the preserved plant material does not display moisture sublimation, as is usually the case with frozen plant materials produced using other techniques. Thus, the preserved plant material produced by the methods of the present invention may be cycled between the freezer and ambient temperatures without freezing into a clump or a solid block, as usually occurs with normal frozen plant products.

The moisture content of the preserved plant material will depend on the type of plant material. However, it is envisaged that the moisture content of the plant material will be reduced during step (b) such that it is in the range of about 25% to about 70%, for example, about 35% to about 65%, about 40% to about 55% or about 45% to about 50% (by weight).

The preserved plant material is ideally dry to the touch, substantially non-cohesive, free-flowing and contains the prized aromatic and/or flavourful characteristics at a higher concentration than in similar preserved plant material produced using currently known techniques.

Surprisingly, the inventors have also found that the preserved plant material may be further dried, either by extending the microwave drying at a suitable level for a further few minutes or by using gentle conventional air-drying methods, to produce an ambient-stable substantially dried plant material which retains both the aromatic/flavourful qualities and the fresh colour to an extent superior to existing products.

Thus, the method of the present invention may also comprise the step of further drying the preserved plant material (i.e. plant material which has undergone step (b) discussed above) to produce a substantially dried plant material that is storage stable for a significant period of time outside of a freezer, for example, at room temperature for at least 6 months, or at temperatures of about 4° C. (i.e. in a refrigerator) for at least about 3 months, but up to about 24 months.

The moisture content of the substantially dried plant material may, for example, be less than about 25%, for example, less than about 12% or between about 5 and 15% (by weight). The inventors have surprisingly found that such a substantially dried plant material is not only stable under ambient storage conditions, but also retains to a substantial degree the advantages of the preserved plant material discussed above.

The preserved plant material may be further dried by exposing the preserved plant material to additional microwave energy or, alternatively, further dried using existing techniques such as air drying, vacuum drying, heat pump drying or freeze drying.

A further characteristic and advantage of the preserved plant materials (and substantially dried plant materials) produced by the method of the present invention is that they can be used as the major or substantial ingredient in commercial products. Thus, by way of a non-limiting example, basil leaves preserved in accordance with the present invention may be mixed with the traditional ingredients to make a basil pesto (including in the recipe an amount of moisture to replace that lost by the basil leaves during preservation). The resultant pesto has an intense fresh basil aroma and flavour as well as a bright natural green colour (even when mixed with hot pasta), and the flavour and colour remain unchanged with time. By contrast, a pesto made with fresh basil leaves darkens with time, especially when mixed with hot pasta, and develops bitter flavours.

It is envisaged that other commercial products which may include the preserved plant materials produced by the method of the present invention may, for example, be a pharmaceutical, cosmetic, perfume or an aromatherapy oil.

The present invention also provides a commercial product which consists essentially of a plant material preserved in accordance with the method of the present invention. Such commercial products include pre-packaged preserved basil leaves, pre-packaged preserved slices of ginger and pre-packaged preserved rose petals.

The present invention also provides a preserved plant material comprising at least 60% of the essential oils present in the fresh plant material from which the preserved plant material was prepared. The preserved plant material has a water activity of less than 0.91 and the majority of browning enzymes (and other deleterious enzymes) present in the fresh plant material from which the preserved plant material was prepared have been substantially inactivated.

The present invention also provides a preserved plant material that has substantially the same colour as the fresh plant material from which the preserved plant material was prepared. The preserved plant material has a water activity of less than 0.91 and the majority of browning enzymes (and other deleterious enzymes) present in the fresh plant material from which the preserved plant material was prepared have been substantially inactivated.

The preserved plant material may, for example, be a leafy vegetable or herb and be green in colour. The preserved plant material may, for example, be leaves of basil, parsley, coriander or mint.

In an eighth aspect, the present invention provides a method for preserving plant material. The method comprises steps (a) to (c):
(a) providing a composition comprising a mineral salt dispersed in a carrier selected from an aqueous carrier, an oil based carrier and a carrier which is a mixture of aqueous and oil components;
(b) applying the composition to the plant material in an amount in the range of from 0.25 g to 20 g of mineral salt per 100 g of plant material; and
(c) drying the plant material comprising exposing the plant material and applied composition to microwave energy to heat the plant material to a temperature effective to inactivate the majority of browning enzymes in the plant material.

In an embodiment of the eighth aspect, the carrier comprises oil.

In an embodiment of the eighth aspect, the carrier comprises a mixture of aqueous and oil components.

In an embodiment of the eighth aspect, the carrier is in the form of an emulsion comprising a mixture of aqueous and oil components.

In an embodiment of the eighth aspect, the oil is selected from vegetable oils.

In an embodiment of the eighth aspect, the oil comprises at least one selected from the group consisting of olive oil, canola oil, sunflower oil, rice bran oil, cotton seed oil, soybean oil, rapeseed oil and castor oil.

In an embodiment of the eighth aspect, the mineral salt comprises at least one cation selected from the group consisting of sodium, magnesium, potassium and calcium.

In an embodiment of the eighth aspect, the mineral salt is selected from the group consisting of sodium chloride, potassium chloride, calcium chloride, magnesium chloride and mixtures of two or more thereof.

In an embodiment of the eighth aspect, the composition is applied to the plant material in an amounts in the range of from 0.5 g to 15 g of mineral salt per 100 g of plant material.

In an embodiment of the eighth aspect, the composition is applied to the plant material in an amount in the range of from 2 g to 10 g of mineral salt per 100 g of plant material.

In an embodiment of the eighth aspect, the mineral salt is present in the composition in an amount in the range of from 0.5% to 55% by weight.

In an embodiment of the eighth aspect, the composition comprises oil in an amount in the range of from 4% to 80% by weight of the total composition.

In an embodiment of the eighth aspect, the composition comprises water in an amount in the range of from 5% to 80% by weight of the total composition.

In an embodiment of the eighth aspect, the composition comprises on the basis of total weight of the composition:
  0.5% to 55% mineral salt,
  4% to 80% vegetable oil,
  5% to 80% water, and
  optionally 0.001% to 5% emulsifier.

In an embodiment of the eighth aspect, the composition contains an emulsifier selected from the group consisting of lecithin, fatty acid esters, polysorbates, pectin, palmitates, stearates, oleates, tartrates and mixtures of two or more thereof.

In an embodiment of the eighth aspect, the plant material and applied composition are exposed to microwave energy for a period of at least 30 seconds. The period may, for example, be in the range of from 30 seconds to 60 minutes.

In an embodiment of the eighth aspect, the microwave energy heats the plant material to a temperature of at least 80° C.

In an embodiment of the eighth aspect, the plant material is exposed to between 10 and 100 watts of microwave energy per gram of plant material, for between 30 seconds and 20 minutes.

In an embodiment of the eighth aspect, the plant material is dried to provide a water activity of below 0.91.

In an embodiment of the eighth aspect, the water content of the dried material is in the range of from 5 to 70% by weight of the dried material.

In an embodiment of the eighth aspect, the water content of the dried material is less than about 24% by weight of the dried material. Alternatively, the water content of the dried material may be the range of from 24% to 65% by weight of the dried plant material.

In an embodiment of the eighth aspect, the plant material is selected from the group consisting of herbs and spices.

In an embodiment of the eighth aspect, the herb or spice is selected from the group consisting of basil, bay leaf, coriander, chili, chives, chervil, dill, garlic, ginger, galangal, lemongrass, mint, marjoram, oregano, parsley, rosemary, sage, thyme and tarragon.

In a tenth aspect, the present invention provides a dried preserved plant material comprising: a water activity of less than 0.91; a majority of browning enzymes inactivated; a content of mineral cation selected from the group consisting of sodium, potassium, magnesium and calcium is in the range of from 0.1% to 10% by weight cation based on the weight of the preserved plant material.

In an embodiment of the tenth aspect, the preserved plant material comprises at least 40% by weight of the essential oils naturally occurring in the plant.

In an embodiment of the tenth aspect, the plant material further comprises a content of an oil which is in addition to any oils naturally occurring in the plant. The oil may, for example, comprise at least one selected from the group consisting of olive oil, canola oil, sunflower oil, rice bran oil, cotton seed oil, soybean oil, rapeseed oil and castor oil.

In an embodiment of the tenth aspect, the plant material further comprises an emulsifier. The emulsifier may, for example, be selected from the group consisting of lecithin, fatty acid esters, polysorbates, pectin, palmitates, stearates, oleates, tartrates and mixtures of two or more thereof.

In an embodiment of the tenth aspect, the plant material is a dried preserved herb or spice, for example, a herb or spice selected from the group consisting of basil, bay leaf, coriander, chili, chives, chervil, dill, garlic, ginger, galangal, lemongrass, mint, marjoram, oregano, parsley, rosemary, sage, thyme and tarragon.

EXAMPLES

Example 1

Freshly harvested sweet basil leaves (*Ocimum* genus) were cleaned of debris in food grade antibacterial wash, optionally containing a low concentration of antioxidant, dewatered and the leaves were removed from the stems. The basil leaves were treated with a coating solution/emulsion of various compositions (set out in Tables 1 and 2) such that the volume of coating was just enough to fully coat the leaves with no excess. The thus coated basil leaves were arranged in a shallow layer on the platform of a bench-top microwave oven (Panasonic model NN-S562WF, inverter-type) programmable to deliver continuous power at from 10 to 100% of full power (1200 W, at an operating frequency of 2,450 mHz) on a rotating turntable for specified time intervals.

In a first batch, the following composition was applied to the leaves (these weights produce a composition for coating 100 g of basil leaves):

TABLE 1

| Component | Parts by weight |
| --- | --- |
| salt | 5 |
| sodium erythorbate | 2 |
| sodium bicarbonate | 2 |
| olive oil | 10 |
| soy lecithin | 0.4 |
| water | 13.8 |

The coating composition of Table 1 was emulsified using a high speed stirrer. The composition was added to the basil leaves quantitatively and then mixed gently with the basil leaves in a rotary tumbler until the basil leaves were uniformly coated. The coating was just sufficient to coat all the leaves, with no excess coating remaining.

The thus coated basil leaves were arranged on the rotary platform of the microwave oven in an even layer. For a microwave of this size the weight of coated leaves per batch was about 24 g. Full power (1200 W) was applied for 1.5 min. followed by 90% power (1080 W) for 30 sec. The coated basil leaves so treated retained a bright green colour, showed no burning or blackening, were flexible/pliable and had lost moisture to give a product comprising about 55% solids (fresh basil has a moisture content of about 92%).

The so-treated basil leaves were packed into a moisture-proof film pouch and placed at −18° C. for storage. The leaves remained flexible/pliable at this temperature and did not freeze hard. The green colour was unchanged. The leaves were free-flowing and non-cohesive. The leaves were brought to ambient temperature then back to −18° C. repeatedly without forming a clump, that is, they remained free-flowing. Their green colour was undiminished.

Basil leaves treated as above were assayed for volatile components, as was a sample of fresh unprocessed basil leaves identical to the leaves processed as above. The total basil volatile oil in the fresh basil leaves was 0.058% w/w and for the basil leaves processed as above it was 0.16% w/w, indicating a considerable degree of concentration of the volatile components in the processed basil.

To assess the culinary quality of the concentrated basil leaves, a pesto sauce was prepared. When the basil leaves treated as above were used to make pesto, extra water was added to replace the water removed during processing. Pesto sauces were also prepared using fresh basil leaves and commercial basil preparations such as dried basil, a basil preparation in a tube and frozen basil. The pesto prepared using the basil treated as above had the brightest green colour and an excellent clean fresh basil flavour. The green colour was retained even after mixing with hot pasta. Pesto made with fresh basil leaves delivered excellent flavour, but the colour rapidly became dark brown and a bitter flavour developed over time. The other basil preparations delivered inferior colour and/or flavour in the pesto sauces prepared from them.

Basil leaves preserved as described above were also used to prepare cooked dishes. Both colour and flavour were retained to a surprising degree and to an extent superior to fresh basil and other preserved basil products.

Alternate coating compositions giving equally acceptable results are shown in Table 2 (in each case the recited weights produce a composition for coating 100 g of basil leaves):

TABLE 2

| Component | Parts by weight | | | |
| --- | --- | --- | --- | --- |
| salt | 10 | 5 | 6 | 2.5 |
| sodium erythorbate | 2 | 1 | 1 | 0 |
| ascorbic acid | 0 | 0 | 0 | 1.78 |
| sodium bicarbonate | 2 | 1 | 1 | 2.84 |
| olive or sunflower oil | 5 | 7 | 10 | 5 |
| soy lecithin | 0.4 | 0.4 | 0.4 | 0.15 |
| water | 13.8 | 13.8 | 13.8 | 13.8 |

Example 2

Basil leaves (*Ocimum* genus) were treated as in Example 1, but the composition applied to the leaves was varied as set out in Table 3.

TABLE 3

| Component | A | B | C | D | E |
| --- | --- | --- | --- | --- | --- |
| salt | 0 | 0 | 0 | 0 | 0 |
| sodium erythorbate | 2 | 0 | 1 | 1 | 0 |
| sodium bicarbonate | 2 | 1 | 1 | 0 | 0 |
| vegetable oil | 10 | 10 | 10 | 10 | 0 |
| lecithin | 0.4 | 0.4 | 0.4 | 0.4 | 0 |
| water | 13.8 | 13.8 | 13.8 | 13.8 | 13.8 |

For each of the treatment compositions A to D above, the basil leaves lost the natural green colour and turned a light olive green colour with some brown patches. The colour of the basil leaves treated using compositions A to D above was not as good as the colour achieved with the treatment of Example 1. For the treatment composition E above, the basil leaves lost their natural green colour and turned a dark brown colour. Basil leaves are notorious amongst botanical products for their strong tendency to browning or blackening. Basil is reported to have abundant and very powerful polyphenol oxidases, which react with polyphenols of various types in many plant tissues.

Without being held to the accuracy of this theory, it is postulated that in the presence of the microwave attractant(s) applied to the leaves, the microwave energy is concentrated in the leaf tissues resulting in much more rapid temperature elevation than would occur in the absence of said attractant(s), with resultant more rapid inactivation of the enzymes (especially polyphenol oxidases) responsible for browning of the tissues. While vegetable oil also acts as a microwave attractant, it is less effective than the ionic and dipolar sodium chloride present in the composition used in Example 1.

In addition to the above striking effect, the rapid heating over a short time can be expected to minimize the conversion of chlorophyll to pheophytin and the consequential diminution of the olive-brown colour of pheophytin.

Example 3

This example compares the flavour and appearance of fresh basil leaves preserved using the method of Example 1 (Treatment A in Table 4) with basil leaves derived from an alternate microwave drying method described below (Treatments B and C in Table 4).

TABLE 4

| Component | Parts by weight | | |
|---|---|---|---|
| | A | B | C |
| salt | 5 | 0 | 5 |
| sodium erythorbate | 2 | 0 | 2 |
| sodium bicarbonate | 2 | 0 | 2 |
| olive oil | 10 | 0 | 10 |
| soy lecithin | 0.4 | 0 | 0.4 |
| water | 13.8 | 0 | 13.8 |

In the alternate microwave drying method (i.e. Treatments B and C), fresh basil leaves are exposed to microwave energy for 1, 2, 1 and 1 minutes at 240, 480, 720 and 1080 W of power respectively. In treatment B, the fresh basil leaves did not have any coating applied to them. However, in treatment C, the coating system of Example 1 was applied to the fresh basil leaves.

The dried leaves obtained from Treatment B were dark olive brown. The inventors found that the green colour of the dried basil leaves obtained using treatment C was far better retained than the dried basil leaves obtained using treatment B, but was inferior to that of the dried basil leaves obtained using treatment A.

The dried leaves obtained from Treatment B were found to have a much higher moisture content (50%) and Aw (0.93) compared with the dried leaves obtained from Treatment C (18%, Aw 0.65), showing that the rate of dehydration of the basil leaves was faster in Treatment C than in Treatment B.

When evaluated in a test pesto formulation (of the type described in Example 1), both the colour, flavour and aroma of sample B was significantly inferior to samples A and C, whilst sample A was significantly better than sample C.

Example 4

Fresh basil leaves (*Ocimum* genus) were trimmed, washed in water, dewatered and the solids determined to be 10% w/w. An emulsion comprising the components with respective ratios (by weight, for coating 1 g of the fresh basil) shown in Table 5 was sprayed evenly onto the basil leaves as in Example 1. The coated leaves were then placed on a rotating base in a 1,200 W microwave oven and dried to 55% solids w/w (i.e. a 45% w/w moisture content). This took about 90 seconds.

TABLE 5

| Component | A | B | C | D |
|---|---|---|---|---|
| NaCl | 0.025 | 0.025 | — | 0.025 |
| Na erythorbate | 0.020 | 0.020 | — | 0.020 |
| NaHCO$_3$ | 0.020 | 0.020 | — | 0.020 |
| Water | 0.138 | — | — | 0.138 |
| Oil | 0.070 | 0.070 | 0.070 | — |

The resultant basil leaves were equilibrated overnight for moisture content and analysed for their colour, texture, taste and aroma. All samples remained flexible when stored at less than −18° C. Sample A was a bright green colour, and had a strong fresh basil taste, aroma and texture. When steeped in water for 10 minutes it was judged to be close in quality to a fresh basil leaf. When analysed for total essential oil content compared with the fresh basil from which it was made, sample A showed about 80% essential oil retention.

Sample B was similar to A, but took approximately 30% less time to dry to the target solids content of 55% w/w. Sample C showed a lot of browning of the leaves. Sample D was similar to sample A in colour and drying time, but when tested for taste and aroma, sample D was less aromatic and had a milder flavour than that of sample A, B or C.

Ranges of the amounts of the components that could be used per 1.0 g of the fresh basil are about 0.01-0.10 g NaCl, about 0.01-0.10 g sodium erythorbate, about 0.01-0.10 g NaHCO$_3$, and about 0.05-0.15 g oil.

As a further comparison, composition D of Table 5 was used to coat fresh basil leaves. However, these coated basil leaves were not microwaved, but instead dried to 55% solids in a through-bed hot air dehydration unit, which took 80 minutes at 60° C. The leaves became black and they developed a hay like character, with their basil aroma and taste being destroyed.

As a further comparison, composition A of Table 5 was used to coat fresh basil leaves. These basil leaves were dried to final moisture content of 12% w/w by dehydration in the microwave oven at 1200 W for 90 seconds, followed by 1000 W for 60 seconds. The resultant product was bright green in colour, had a strong basil aroma similar to the fresh basil and was shelf stable.

Example 5

Fresh coriander leaves (*Coriandrum* genus) were trimmed from the stalks and their solid content determined to be 10% w/w. An emulsion comprising (per 1 g of the coriander leaves) 0.025 g sodium chloride, 0.01 g sodium erythorbate, 0.01 g sodium bicarbonate, 0.138 g water and 0.07 g oil was sprayed evenly onto the leaves, as in Example 1. A second emulsion comprising (per 1 g of the coriander leaves) 0.025 g sodium chloride, 0.01 g ascorbic acid, 0.0142 g sodium bicarbonate, 0.138 g water and 0.05 g oil was also sprayed evenly onto the leaves, as in Example 1. The coated leaves were then placed on a rotating base in a 1,200 W microwave oven and dried to 55-60% solids w/w, which took about 80-100 seconds.

The resultant products were equilibrated overnight for moisture content and then analysed for their colour, texture, taste and aroma. The leaves were bright green in colour, with an excellent fresh coriander leaf aroma and flavour, similar the fresh non-dried leaf A sample of each of the preparations was stored in a domestic refrigerator (approx 4-10° C.) for two weeks, after which the leaves were still bright green in colour, with an excellent fresh coriander leaf aroma and flavour. The leaves remained flexible and free flowing when stored at about −18° C. for over 1 year.

Example 6

Fresh mint (*Mentha* genus) leaves were trimmed from the stalks and their solid content determined to be 9.8% w/w. A first emulsion (A) comprising (per 1 g of the mint leaves) 0.025 g sodium chloride, 0.02 g sodium erythorbate, 0.02 g sodium bicarbonate, 0.138 g water, 0.004 g soy lecithin and 0.07 g oil was sprayed evenly onto a first batch of leaves, as in Example 1.

A second emulsion (B) comprising (per 1 g of the mint leaves) 0.025 g sodium chloride, 0.02 g ascorbic acid, 0.0284 g sodium bicarbonate, 0.138 g water, 0.0025 g soy lecithin and 0.05 g oil was sprayed onto a second batch of leaves. The coated leaves were then placed in on a rotating base in a 1,200 W microwave oven and dried to 59% solids w/w, which took about 110 seconds.

A third batch of leaves (C) were not coated with the composition and microwaved in the same manner.

Finally, a fourth emulsion (D) was prepared comprising (per 1 g of the mint leaves) 0.012 g sodium chloride, 0.018 g ascorbic acid, 0.0284 g sodium bicarbonate, 0.11 g water, 0.001 g soy lecithin and 0.05 g oil was sprayed onto a fourth batch of leaves. The coated leaves were dried in the microwave oven at 1200 W as before but to a final moisture content of either 20% or 10% (w/w).

The resultant products were equilibrated overnight in moisture-proof film and analysed for moisture content and analysed for their colour, texture, taste and aroma. The leaves of the uncoated microwaved products (C) were very brown in colour and had a bitter flavour. In contrast, the microwaved leaves that had been treated with the emulsion ((A), (B) and (D)) were intense green in colour with an excellent fresh mint aroma and flavour similar to the fresh non-dried leaf.

The mint leaves preserved using treatment D were packed in moisture-proof film. The leaves having 10% moisture content were shelf-stable for at least 1 year at ambient conditions (24° C.), where they remained bright green and had a strong and distinctive mint aroma, taste and colour. The leaves having 20% moisture content were shelf-stable when stored in a domestic refrigerator (approx 4-10° C.) for at least 6 months, also retaining their bright green and strong mint aroma and taste.

Example 7

Fresh parsley (*Petroselinum* genus) leaves were trimmed and their solid content determined to be 11% w/w. An emulsion comprising (per 1 g of the parsley leaves) 0.025 g sodium chloride, 0.02 g sodium erythorbate, 0.02 g sodium bicarbonate, 0.138 g water, 0.004 g soy lecithin and 0.07 g oil was sprayed evenly onto the leaves, as in Example 1. The coated leaves were then placed on a rotating base in a 1,200 W microwave oven and dried to 59% solids w/w, which took about 110 seconds. Another batch of leaves were not coated with the composition at all and microwaved in the same manner.

The resultant products were equilibrated overnight for moisture content and then analysed for colour, texture, taste and aroma. The leaves of the uncoated microwaved products were very brown in colour and had a bitter flavour. In contrast, the microwaved leaves that had been treated with the emulsion were intense green in colour with an excellent fresh parsley aroma and flavour similar the fresh non-dried leaf.

Example 8

Fresh red chillies were prepared by slicing to 2 mm thickness and the solids content was determined as 16% w/w. An emulsion comprising (per gram of prepared chilli) 0.02 g sodium chloride, 0.0067 g ascorbic acid, 0.0032 g sodium bicarbonate, 0.11 g water, 0.0015 g soy lecithin, 0.05 g oil was sprayed evenly onto the slices in a slowly rotating tumbler for 2.5 minutes. The coated sliced were then placed on a rotating base in a 600 W microwave oven and dried to 50% solids w/w which took 8 minutes. The resultant products were allowed to cool to room temperature, packed in moisture-proof film and equilibrated overnight before long-term storage at −18° C. The products retained their bright red colour, had a typical sweet fragrance of freshly chopped red chillies and were very pungent to taste.

Example 9

Fresh *Narcissus jonquilla* were obtained from the market and petals removed from their stems and the solids content determined to be 8% w/w. A composition comprising vegetable oil was applied to the petals at a rate of 0.49 g per gram of petals (sample A). Another sample of petals was left uncoated (sample B). The oil treated petals sample A were subjected to microwave drying to 50% solids w/w by placing them on a rotating base in a single layer in a microwave set at 600 W oven for 7 minutes or a total of 4,200 W. The uncoated petals sample B were dried to 50% solids the same way, but required 1,200 W for 6 minutes or a total of 72,000 W. The two samples were then compared in aroma and sample B had a much milder aroma to sample A, which was very intense. The colour of sample A was retained as a concentrated form of the fresh petals.

Example 10

Basil leaves (*Ocimum* genus) were prepared and treated as in Example 1, except that the amount of NaCl (salt) in the composition applied to the leaves was varied as set out in Table 6. In Treatments A to F, the composition was applied to the leaf in an amount which provided the % of NaCl specified in Table 6, as well as sodium erythorbate (0.75%), sodium bicarbonate (0.75%), sunflower oil (5%), lecithin (0.15%) and water (13.8%) expressed in relation to the leaf weight. A negative control treatment was also conducted, where no coating was used on the leaves (Treatment G).

The coated leaves were microwaved for an average of 2 minutes to 55-65% solids. The dried leaves of each treatment A through G were cooled and packed into a moisture-proof film pouch and equilibrate for moisture content and then placed at −18° C. for storage observations at day 1.

TABLE 6

| Treatment | % NaCl of the leaf weight | % green colour retention |
| --- | --- | --- |
| A | 5 | 100% |
| B | 2.5 | 100% |
| C | 2.0 | 100% |
| D | 1.5 | 100% |
| E | 0.75 | 90% |
| F | 0 | 60% |
| G | 0 | 30% |

As the salt concentration was reduced, the susceptibility to browning increased showing a threshold of acceptable colour at 0.75% NaCl (treatments A-E). When NaCl is totally omitted in treatment F, the green colour was not as bright green as samples with higher NaCl content, but the other ingredients in the composition can achieve a degree of enzyme inactivation and partial colour stability. However, in the absence of any composition coating, the leaves immediately brown after microwave drying and the majority of the green colour is lost and the leaves became unacceptably olive green to dark brown after several hours equilibration in packaging film. Samples A, B, C, D and E had excellent basil flavour and aroma but F had a milder flavour. Sample G tasted bitter, had a very mild basil aroma with dominant hay like aroma.

Example 11

Fresh ginger stems were prepared by peeling (optional) and slicing to 1.5 mm thickness. The solids content was determined as 19.6% w/w. An emulsion comprising (per gram of prepared ginger) 0.012 g sodium chloride, 0.004 g citric acid, 0.138 g water, 0.002 g soy lecithin and 0.05 g oil was sprayed evenly onto the slices in a slowly rotating tumbler for 2.5 minutes. The coated slices were then placed on a rotating base in a 600 W microwave oven and dried to 55% solids w/w, which took 4 minutes and 40 seconds. The resultant products were allowed to cool to room temperature, packed in moisture-proof film and equilibrated overnight before long-term storage at −18° C. The products retained their bright yellow colour, had a typical ginger fragrance of fresh ginger and were very pungent to taste.

Example 12

Fresh garlic was prepared by slicing peeled cloves to 2-2.5 mm thickness, and the solids content was determined as 28.7% w/w. An emulsion comprising (per gram of prepared garlic) 0.025 g sodium chloride, 0.002 g ascorbic acid, 0.138 g water, 0.002 g soy lecithin and 0.05 g oil was sprayed evenly onto the slices in a slowly rotating tumbler for 2.5 minutes. The coated slices were then placed on a rotating base in a 600 W microwave oven and dried to 55-65% solids w/w, which took 3 minutes and 30 seconds. The resultant products were allowed to cool to room temperature, packed in moisture-proof film and equilibrated overnight before long-term storage at −18° C. The products retained their creme colour, had a typical fragrance of fresh garlic and were very pungent to taste.

Example 13

Fresh basil leaves can be treated in the following manner.

| Component | Proportion (%) |
| --- | --- |
| NaCl | 9.590 |
| Ascorbic Acid | 6.828 |
| NaHCO$_3$ | 10.894 |
| water | 52.934 |
| Soy Lecithin | 0.575 |
| Sunflower Oil | 19.179 |

Process Method
1. Supply fresh basil leaves with stem
2. Wash, spin by salad spinner (15-20 secs)
3. With a sharp knife, cut at right angles to the stem into 3.5 cm sections
4. Sort the cut leaves away from stem
5. Weigh 18 gms (the actual batch size) of the cut leaves
6a. Weigh NaHCO$_3$+Ascorbic Acid+water into a beaker. Allow the reaction to complete with gas formation (20 seconds)
6b. Then add NaCl+Oil+Soy Lecithin. Make an emulsion by stirring with a spoon or stick mixer for large volumes
7. Pour composition (4.69 g) onto leaves in the sealed tumbler on medium speed
8. Tumble for 5 mins (for single batch, 2 min for 4 times batch)
10. Place leaves on a Teflon mat 5 cm above the microwave oven carousel
11. Test dry at 1200 W (e.g. 100% power setting) for 1 min 50 secs (or <2 mins) and check weight to achieve target weight of 55% solids
12. Continue MW drying to target solids of 55% by weight
13. Chop immediately after drying if required for shaker packs
14. Equilibrate overnight at 4° C. & then store at −18° C. in sealed moisture barrier film

Example 14

Fresh ginger can be treated in the following manner.

| Component | Proportion (%) |
| --- | --- |
| NaCl | 5.839 |
| Citric Acid | 1.946 |
| Water | 67.153 |
| Soy Lecithin | 0.730 |
| Sunflower Oil | 24.331 |

Process Method
1. Peel ginger
2. Slice ginger on Benreiner to 1.5 mm thickness
3. With a sharp knife, cut into shreds of 2 mm width (commercially a shredder can be used for this operation)
4. Weigh 18 gms (the actual batch size) of the cut material
5. Weigh solutes separately in a beaker. Make an emulsion by stirring with a spoon
6. Pour emulsion (5.55 g) onto ginger shreds in a tumbler
7. Tumble for 5 mins
8. Place ginger shreds on a single layer teflon mesh about 5 cm above a flat ceramic plate
9. Place in the inverter microwave oven carousel
10. Test dry to 600 W (50% power setting) for 4 mins 40 secs (or <5 mins) to achieve drying with minimal aroma emission
11. Dry to target solids of 55%
12. Chop immediately after drying if required for shaker packs
13. Equilibrate overnight at 4° C. & then store at −18° C. in sealed moisture barrier film

Example 15

Fresh red chillies can be treated in the following manner.

| Component | Proportion (%) |
| --- | --- |
| NaCl | 10.45 |
| Ascorbic Acid | 3.50 |
| NaHCO$_3$ | 1.67 |
| water | 57.47 |
| Soy Lecithin - Yelkin ADM | 0.78 |
| Sunflower Oil | 26.12 |

Process Method
1. Take whole Red Chillies and chop the tips
2. Pass it through the slicer (food processor) to get 2 mm thick slices
3. Separate out the seed by passing through a mesh and discard the seeds
4. Weigh 18 gms (the actual batch size) of chilli slices
5. Weigh solutes separately in a beaker. Make an emulsion by stirring with a spoon
6. Pour emulsion (3.8 g) onto chilli slices in a tumbler
7. Tumble for 2.5 mins 8. Place the chilli slices on a single layer teflon mesh about 5 cm above a flat ceramic plate
9. Place in the inverter microwave oven carousel
10. Test dry to 600 W (50% power setting) for 8 mins 30 secs (or <9 mins) to achieve drying with minimal aroma emission
11. Dry to target solids of 55%
12. Equilibrate overnight at 4° C. & then store at −18° C. in sealed moisture barrier film It will be understood to persons skilled in the art of the invention that many modifications may be made without departing from the spirit and scope of the invention.

It is to be understood that any prior art publication referred to herein does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for preserving an herb or spice selected from the group consisting of basil, bay leaf, coriander, chili, chives, chervil, dill, garlic, ginger, galangal, lemongrass, mint, marjoram, oregano, parsley, rosemary, sage, thyme and tarragon, comprising:
   (a) uniformly applying a composition comprising an oil and a microwave attractant to said herb or spice; and then
   (b) drying said herb or spice while exposing said herb or spice to microwave energy at ambient air pressure, wherein said herb or spice is exposed to between about 10 to about 100 watts of microwave energy per gram of plant material, for between about 1 and about 3 minutes to inactivate the majority of any browning enzymes in said herb or spice, and wherein the microwave attractant results in the heating of said herb or spice occurring at a rate whereby browning of said herb or spice by the browning enzymes during heating is substantially prevented.

2. The method of claim 1, wherein the composition is an aqueous composition.

3. The method of claim 1, wherein the microwave attractant comprises an at least partially water-soluble salt.

4. The method of claim 1, wherein the microwave attractant comprises an at least partially water-soluble salt having a cation selected from the group consisting of: sodium, magnesium, potassium and calcium.

5. The method of claim 1, wherein the composition is applied to said herb or spice in an amount which provides between about 0.1% to about 20% by weight of microwave attractant to said herb or spice, based on the total weight of said herb or spice before application of the composition to said herb or spice.

6. The method of claim 1, wherein during step (b) the moisture content of said herb or spice is reduced by more than 15% in less than about 10 minutes.

7. The method of claim 1, wherein said herb or spice is dried to provide a water activity of below 0.91.

8. The method of claim 1, wherein the moisture content of said preserved herb or spice is in the range of about 5% to about 70% (by weight).

9. The method of claim 1, wherein the composition comprises an antioxidant.

10. The method of claim 9, wherein the antioxidant is sodium ascorbate, sodium erythorbate, a tocopherol, ascorbic acid or a combination thereof.

11. The method of claim 1, wherein the composition comprises an emulsifier.

12. A method for preserving a plant material, comprising:
   (a) applying to the plant material a composition comprising an at least partially water soluble salt and/or an oil; and then
   (b) drying the plant material while exposing the plant material to microwave energy, wherein the microwave energy is applied to the plant material between about 10 to about 100 watts of microwave energy per gram of plant material, for between about 1 and about 3 minutes to heat the plant material to a temperature effective to inactivate the majority of any browning enzymes in the plant material.

13. The method of claim 12, wherein the composition comprises 0.5% to 55% by weight of an at least partially water-soluble salt or mixture of at least partially water soluble salts.

14. The method of claim 13, wherein the composition is applied to the plant material in an amount which provides between about 0.1% to about 20% by weight of the salt(s) to the plant material, based on the total weight of the plant material before application of the composition to the plant material.

15. A method for preserving herbs and spices, comprising:
   (a) uniformly applying a composition comprising an oil and a microwave attractant to the herbs and spices, wherein the microwave attractant includes an at least partially water-soluble salt having a cation selected from the group consisting of: sodium, magnesium, potassium and calcium, and wherein the composition is uniformly applied to the herbs and spices in an amount which provides between about 0.1% to about 20% by weight of microwave attractant to the herbs and spices, based on a total weight of the herbs and spices before the applying of the composition to the herbs and spices, and then
   (b) drying the herbs and spices to reduce a moisture content of the herbs and spices by more than 15% in less than about 10 minutes while exposing the herbs and spices to microwave energy at ambient air pressure, wherein the herbs and spices are exposed to between about 10 to about 100 watts of microwave energy per gram, for between about 1 and about 3 minutes to inactivate the majority of any browning enzymes in the herbs and spices, and
   wherein the microwave attractant results in the heating of the herbs and spices occurring at a rate whereby browning of the herbs and spices by the browning enzymes during heating is substantially prevented.

16. A method for preserving herbs, comprising:
   (a) uniformly applying a composition comprising an oil and a microwave attractant to the herbs; and then
   (b) drying the herbs while exposing the herbs to microwave energy at ambient air pressure, wherein the herbs are exposed to between about 10 to about 100 watts of microwave energy per gram, for between about 1 and about 3 minutes to inactivate the majority of any browning enzymes in the herbs, and wherein the microwave attractant results in the heating of the herbs occurring at a rate whereby browning of the herbs by the browning enzymes during heating is substantially prevented.

* * * * *